US006239746B1

(12) United States Patent
Pipon et al.

(10) Patent No.: US 6,239,746 B1
(45) Date of Patent: May 29, 2001

(54) RADIOGONIOMETRY METHOD AND DEVICE CO-OPERATING IN TRANSMISSION

(75) Inventors: François Pipon, Paris; Jean-Jacques Monot, Courdimanche; Pascal Chevalier, Courbevoie; Thierry Aste, Caluire et Cuire, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/445,029

(22) PCT Filed: May 29, 1998

(86) PCT No.: PCT/FR98/01093

§ 371 Date: Dec. 3, 1999

§ 102(e) Date: Dec. 3, 1999

(87) PCT Pub. No.: WO98/55881

PCT Pub. Date: Dec. 10, 1998

(30) Foreign Application Priority Data

Jun. 3, 1997 (FR) .................................. 97/06801

(51) Int. Cl.[7] ................. G01S 5/04; G01S 5/02
(52) U.S. Cl. .................. 342/440; 342/417; 342/441
(58) Field of Search ................. 342/423, 368, 342/417, 420, 431, 440, 441, 432, 438, 378; 702/190, 191, 194, 195, 197, 198, 199; 708/323; 375/229–236

(56) References Cited

U.S. PATENT DOCUMENTS

| 5,752,168 | 5/1998 | Monot et al. . |
| 5,812,090 | 9/1998 | Chevalier et al. . |
| 5,870,430 | 2/1999 | Pipon et al. . |

OTHER PUBLICATIONS

Separation of cochannel signals in TDMA mobile radio, Keerthi, A.V.; Shynk, J.J., Signal Processing, IEEE Transactions on , vol. 46 Issue: 10 , pp.:2684–2697, Oct. 1998.*

* cited by examiner

Primary Examiner—Thomas H. Tarcza
Assistant Examiner—Fred H Mull
(74) Attorney, Agent, or Firm—Oblon, Spivak, McClelland, Maier & Neustadt, P.C.

(57) ABSTRACT

A process and device related to multisensor radio direction finding receivers usable in radio communication systems including several emission sources. The process and device isolate the contribution of each emission source in sensor signals so as to perform direction finding on a single emission source only, based on learning sequences inserted into waveforms emitted by each of the emission sources. Such a process and device may find particular application to cellular communication networks.

13 Claims, 3 Drawing Sheets

RADIOGONIOMETRY METHOD AND DEVICE CO-OPERATING IN TRANSMISSION

BACKGROUND OF THE INVENTION

Field of the Invention

The present invention relates to a process and a device for cooperative radio direction finding in transmission mode for waveforms comprising a signal modulated by linear modulation or which can be approximated as such, this signal being composed of frames comprising learning sequences known to the receiver and of useful information sequences.

The invention can be applied in particular to digital cellular mobile radio communications networks, such as GSM, etc. Within such a context, a base station can perform direction finding on each mobile by using the bursts naturally emitted in the course of the communication, so as subsequently to transmit directionally towards each mobile, by knowing the arrival directions through direction finding. Such a procedure, based on the direction finding of each of the mobiles of the network, thus makes it possible to limit the risks of jamming of the other cells and affords the possibility of introducing the SDMA (Spatial Division Multiple Access) mode, where several users can use the same frequency at the same time.

DISCUSSION OF THE BACKGROUND

At present, several types of high-resolution or super-resolution methods make it possible to perform direction finding in the presence of several sources. Among these methods, it is common to use those known under the names MUSIC, ESPRIT, Minimum Norm or "Maximum likelihood" for high-resolution direction finding, and that known by the name CAPON for super-resolution direction finding.

By way of indication, a description of these methods can be found in the following articles.

The MUSIC method has been published in the article entitled "Multiple Emitter Location and Signal Parameter Estimation" from the journal IEEE Trans. Ant. Prop., Vol. AP-34, No. 3, pp 276–280, March 1986, author M. R. D. SCHMIDT.

The ESPRIT method is known from the article entitled "Estimation of Signal Parameters via Rotational Invariance Techniques" from the journal IEEE Transaction ASSP, Vol. ASSP-37, No. 7, pp 984–995, July 1989, authors MM. R. ROY, T. KAILATH.

The Minimum Norm or Modified FB2B (MFBCP) method is known from the article entitled "Estimating the Angles of Arrival of Multiple plane waves" from the journal IEEE Trans. Aerosp. Elect-syst., Vol. AES-19, No. 1, pp 134–138, January 1983, authors MM. R. KUMARESAN, D. W. TUFTS.

The maximum likelihood method is known from the article entitled "Maximum Likelihood Localizated of Multiple Sources by Alternating Projection" from the journal IEEE Trans. ASSP, Vol. ASSP-36, No. 10, pp 1553–1560, October 1988, authors MM. I. ZISKIND, M. WAX.

The CAPON, MV, MLM method is known from the article entitled "High Resolution Frequency—Wave number Spectrum Analysis" from the journal IEEE, Vol. No. 8, pp 1408–1418, August 1969, author M. J. CAPON.

Nevertheless, these methods are limited by the number of sensors of the network used. Experimentally, with N sensors, it is possible to separate N/2 paths arriving at the network.

Now, when several sources are present, each of these sources can be associated with several propagation paths:
  reflections of the ionospheric layers for the HF frequency range,
  reflections of obstacles (buildings, hills, etc.) in urban or mountainous type environments for the other frequency ranges,
  and the number of paths associated with all the sources can become too large for the direction finding method to be able to separate them all.

SUMMARY OF THE INVENTION

The aim of the invention is to isolate each of the sources reaching the network, so that the direction finding need process only the paths associated with a single source.

For this purpose, the subject of the invention is a process of cooperative radio direction finding in transmission mode in a radio direction finding receiver for radio communication system comprising several emission sources, the receiver being of the type comprising a network of sensors coupled to a radio direction finder characterized in that it comprises:
  a first step consisting in digitizing the signal received by each sensor,
  a second step consisting in performing a capture of synchronization on the signals emanating from the first step;
  and a third step consisting, on the basis of the learning sequences inserted into the waveforms emitted by each source, in isolating the contribution of each source in the sensor signals so as to perform the direction finding on a single source only.

Its subject is also a device for implementing the aforesaid process.

The process described in the invention makes it possible to improve the direction finding performance in the presence of several sources in a transmission context. It also has the advantage of making it possible to locate the mobiles, so as to transmit directionally towards each mobile by knowing the arrival direction of the mobiles subjected to direction finding. It makes it possible to reduce the emission power at constant range, or to increase the emission range at constant power and hence to reduce the jamming of the other cells.

As another advantage, the process according to the invention makes it possible to ascertain the source to which the paths subjected to direction finding correspond, this not being possible with conventional direction finding where one of the difficulties is to allocate a source to each path detected since the arrival directions associated with one and the same source may be totally different.

When propagation takes place along a dominant path, the method of direction finding implemented after the step of isolating each source can be conventional, by channel formation or by interferometry as described for example in the article entitled "Les techniques d'interférométrie utilisées dans les radiogoniomètres à Thomson-CSF" [Interferometry Techniques used in Thomson-CSF radio direction finders] published in the Thomson-CSF Technical Journal, Vol. 19, No. 2, pp 249–287, June 1987.

BRIEF DESCRIPTION OF THE FIGURES

Other characteristics and advantages of the invention will become apparent in the description which follows with regard to the appended drawings which depict.

DESCRIPTION OF THE PREFERRED EMBODIMENTS

The principle of the invention is to perform a radio direction finding by using the learning sequences inserted into the waveform. Two methods may be implemented.

The first method consists, for deducting the contribution of a given source, in performing a channel estimation on the learning sequence associated with this source. Channel estimation makes it possible to deduct the contribution of this source on the sensor signals, and to perform the direction finding in the presence of one source less. If all the learning sequences are synchronized, it is possible for each of the M sources reaching the network, to determine the associated signal, by deducting the contribution of the other M−1 sources, after having performed a channel estimation on these M−1 sources.

A second method consists in calculating the vectors containing the spatial information of each of the paths associated with the source subjected to direction finding (the so-called useful source), with a minimal influence of the other M−1 sources. These vectors are calculated at a first stage with the aid of the learning sequence for the useful source, either by performing a correlation between the sensor signal vectors and the learning sequence on each of the positions corresponding to the length of the impulse response of the useful channel, or by performing a useful channel estimation on each of the sensors. The direction finding analysis is performed on the vectors emanating from these correlations, either by using the vectors obtained on the learning sequences for several consecutive frames, or by integrating the results within a correlation matrix calculated on the vectors obtained over several consecutive frames. This method is beneficial when the correlations between the reference sequences associated with the various sources are weak, that is to say typically in the case of transmissions in CDMA (Code Division Multiple Access) mode. However, for a system such as the GSM system, this method can give deceptive results, since the temporal correlation between the learning sequences can be high and in this case it is better to use the first method.

According to one or other of the two methods, when two emissions reach the network, the direction finding is carried out alternately on one then on the other emission. When the direction finding is carried out on one emission, the latter is termed the useful signal, and the other emission is termed the jammer signal.

Figure 1:
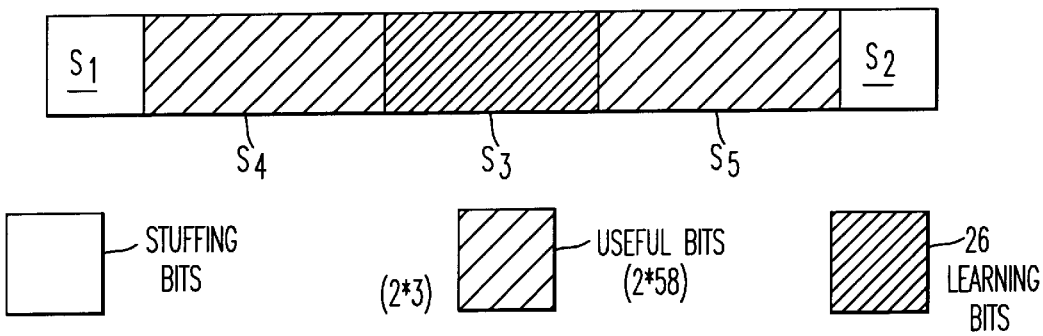
FIG. 1, the makeup of a GSM burst.

The exemplary implementation of the first method is described hereinbelow in a GSM application using GMSK modulation (index ½ and BT=0.3) with a symbol period equal to 48/13 μs. The symbols transmitted on the traffic channels consist, as shown in FIG. 1, of frames of 148 symbols each made up of two sequences $S_1$, $S_2$ of 3 stuffing bits disposed at their ends, of a learning sequence $S_3$ made up of 26 known bits disposed in the middle of the frame and of two sequences $S_4$, $S_5$ of 58 information bits each disposed on either side of the learning sequence $S_3$.

GMSK modulation is a continuous-phase modulation which can be expressed approximately in the form of a linear modulation, as is defined in the article entitled "Exact and approximate construction of digital phase modulations by superposition of amplitude modulated pulse (AMP)" published in IEEE Transactions on Communications Vol. 34 (1986) pp 150–160, author P. A. LAURENT.

In GMSK modulation the modulated signal z(t) can be written in the form of a convolution product according to the relation:

$$z(t) = \left(\sum_n s_n \delta(t)\right) \cdot C_0(t) = s(t) * C_0(t) \text{ with } s(t) = \sum_n s_n \delta(t) \quad (1)$$

In relation (1) the string $\{S_n\}$ is that of the symbols transmitted, $C_0(t)$ is the first principal function of the GMSK modulation and δ(t) is the Dirac pulse.

The string $\{S_n\}$ is used to perform the channel estimation. Denoting by $\{d_n\}$ the string of bits transmitted for a given source, taking the values "0" or "1", the corresponding data $d_n$ are coded differentially before being modulated. The information transmitted consists of the string $\{a_n\}$, calculated from the string $\{d_n\}$ through the following formulae:

$a_n=1$ if $d_n=d_{n-1}$ and $a_n=-1$ if $d_n \neq d_{n-1}$

In relation (1), the symbols $S_n$ can be written:

$S_n = j^n b_n$ with $$b_n = \prod_{k \leq n} a_k \quad (2)$$

Within the framework of the invention the jammer signal z(t) arrives at the receiving antenna network formed of K sensors, after traversing the mobile radio propagation channel. The multisensor signal can be written:

$$\overline{X}(t) = [x_1(t), \ldots, x_k(t)]^T = s(t) * \overline{G}(t) + \overline{X}_u(t), \quad (3),$$

where
  s(t) is the jammer signal,
  $\overline{G}(t)$ is the jammer multisensor channel received, consisting of the overall emission waveform $C_0(t)$, of the emission filter, of the propagation channel and of the reception filter,
  $x_i(t)$ is the signal received on sensor i,
  $\overline{X}_u(t)$ is the contribution of the useful signal and of the background noise which must be estimated by deducting the estimated contribution of the jammer signal.
  $\overline{X}(t)$ can also be written as a function of the symbols transmitted:

$$\overline{X}(t) = \sum_n s_n \overline{G}(t - nTs) + \overline{X}_u(t). \quad (4)$$

where Ts is the symbol period.

Figure 2:
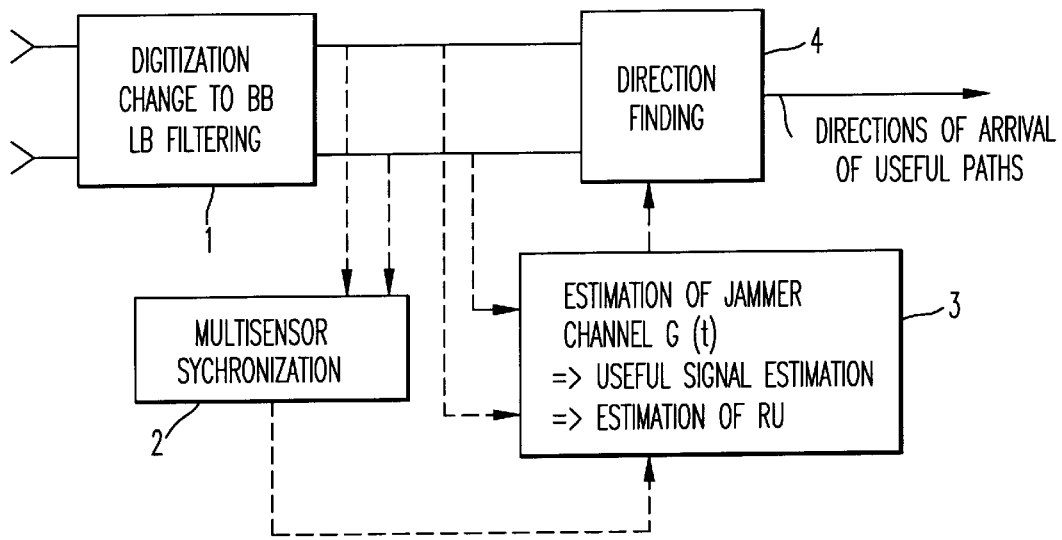
FIG. 2, the various steps of the cooperative radio direction finding process according to the invention in the form of a flow chart for illustrating the first method, FIG. 3, a receiver for implementing the process according to the invention according to the first method, FIG. 4, the various steps of the process according to the invention in the form of a flow chart for illustrating the second method, FIG. 5, a receiver for implementing the process of the invention according to the second method.

In the course of the first step 1 which is represented in FIG. 2, the signals received on the antenna network are digitized, transposed into baseband, then filtered by a reception filter by any known process (not represented). This step provides a complex signal sampled at a frequency $F_e$ which is a multiple of the symbol frequency Fs. The subsequent step 2 performs a synchronization of the receiver with the complex signal obtained, according for example to the process described in French Patent Application No. 2 715

488 filed in the name of the applicant and entitled "procédé de synchronisation en présence de brouilleurs et de multi-trajets" [process for synchronization in the present of jammers and multipaths] or any other process allowing synchronization in the presence of jammers and multipaths.

The synchronization makes it possible to position the receiver in such a way that the signal received $\overline{X}(nTe)$ can be expressed as a function of the jammer signal emitted $s(nTe), s[(n-1)Te], \ldots, s[(n-L+1)]Te$ where L represents the length (in terms of number of samples) of the jammer propagation channel taken into account during the channel estimation and Te is the sampling period through the relation:

$$\overline{X}(n\ Te) = \sum_{p=0}^{L-1} s[(n-p)Te]\overline{G}(p\ Te) + \overline{X}_u(nTe) \quad (5)$$

The samples of the jammer signal $s(nTe)$ can be expressed when the signal is oversampled by a factor of 2 with respect to the symbol frequency on the basis of the jammer symbols emitted through the relations:

$$s[(2n)Te]=s_n \text{ and } s[(2n+1)Te]=0$$

The estimation of the jammer channel $\overline{G}(t)$ and of the correlation matrix of the useful signal plus noise ($R_u$) takes place in step 3. This estimation is carried out according to three substeps, a substep of estimating the jammer channel on each of the input pathways, a substep of estimating the samples of useful signal plus noise on each of the input pathways and a substep of estimating the correlation matrix of the useful signal Ru.

The estimation of the jammer channel on each of the input pathways is performed by regarding the vector $\overline{G}k$ as made up of the temporal samples of the jammer propagation channel on pathway k according to the relation:

$$\overline{G}_k=(g_k(0),\ldots,g_k[(L-1)Te])^T. \quad (6)$$

where $g_k(t)$ represents the jammer channel obtained on pathway k.

Denoting:

$$\overline{S}(nTe)=\{s(nTe),\ldots,s[(n-L+1)Te]\}^T$$

the vector formed with the aid of the jammer symbols known to the learning sequence, the signal received by antenna k can be written:

$$x_k(n\ Te) = \overline{G}_K^H \overline{S}(n\ Te) + x_{u,k}(n\ Te) \quad (7)$$

where $x_{u,k}(n\ Te)$ represents the useful signal+noise samples received on pathway k and where the operator $^{<H>}$ represents the transposition/conjugation operation.

Estimation of the channel on pathway k is obtained through the known formula of Wiener:

$$\overline{G}_k = R_{SS}^{-1} \overline{r}_{sx} \quad (8)$$

where the correlation matrix $R_{ss}$ and the crosscorrelation vector $\overline{r}_{sx}$ are estimated on the 16 bits positioned at the centre of the learning sequence (i.e. on N=32 samples when Te=Ts/2) by the unbiased conventional estimator according to the relations:

$$R_{SS} = \frac{1}{N}\sum_{n=0}^{N} \overline{S}(nTe)\overline{S}(nTe)^H \quad (9)$$

$$\overline{r}_{sx} = \frac{1}{N}\sum_{n=0}^{N} \overline{S}(nTe)x_k(nTe)^*$$

In the GSM system, the correlation sequences are chosen in such a way as to obtain cancellation of the autocorrelation function on 5 symbols either side of t=0. The matrix $R_{ss}$ is therefore equal to the identity matrix and consequently the channel estimation is carried out directly on the basis of $\overline{r}_{sx}$ and then $\overline{G}_k = \overline{r}_{sx}$.

The estimation of the samples of useful signal plus noise on each of the input pathways is obtained from the estimation of the propagation channel according to the relation:

$$x_{u,k}(n\ Te) = x_k(n\ Te) - \overline{G}_k^H \overline{S}(n\ Te) \quad (10)$$

When the network receives M jammers whose learning sequences are synchronized, on each sensor k, the vectors $\overline{G}_{k,j}$ of the propagation channel of each jammer i are estimated in succession through the formulae (8) and (9), and the estimates of the (useful signal+noise) samples are obtained through the formula:

$$x_{u,k}(n\ Te) = x_k(n\ Te) - \sum_{i=1}^{M} \overline{G}_{k,i}^H \overline{S}_i(n\ Te) \quad (11)$$

where $S_i$ (n Te) is the vector formed with the aid of the symbols known to the learning sequence of jammer i.

An estimate of the useful signal+noise vector is thus obtained:

$$\overline{X}u(n\ Te)=[x_{u,1}(n\ Te),\ldots,x_{u,k}(n\ Te)]^T$$

for the N samples used by the channel estimation.

When the correlation matrix of the useful signal is required by the direction finding, the latter is obtained from the (useful signal+noise) samples $\overline{X}u(n\ Te)$ estimated by the unbiased conventional estimator:

$$R_u = \frac{1}{N}\sum_{n=0}^{N} \overline{X}u(n\ Te)\overline{X}u(n\ Te)^H \quad (12)$$

So as to improve the quality of estimation of the correlation matrix $R_u$, especially in the presence of time-selective fading, it may be beneficial to estimate this matrix over several frames (sufficiently spaced so as to obtain different fading states, but sufficiently close that the arrival directions to be estimated do not vary) and to average the estimates thus obtained. The direction finding of the useful signal is performed in step 4 on the basis of the estimation of the correlation matrix $R_u$. It can be carried out using any type of known method such as these, i.e. high resolution, super resolution, channel formation or by interferometry. For this latter method, only the estimation of the useful signal+noise samples is necessary, etc.

Figure 3:
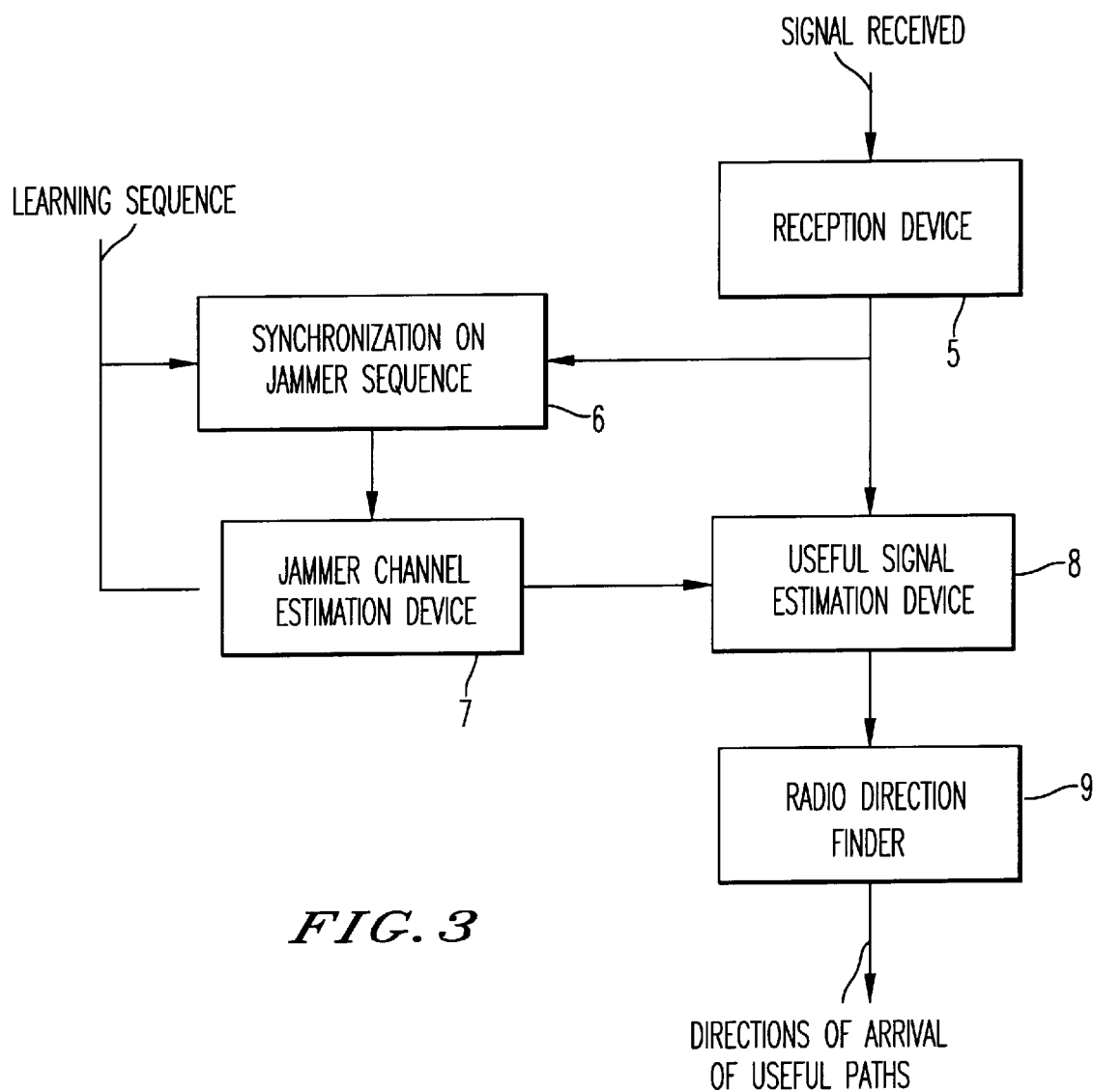

A receiver for implementing the process according to the invention is represented in FIG. 3.

It includes:
a device 5 for receiving the signal received on each reception pathway, accompanied in a known manner by a device (not represented) for changing it to baseband, low-pass filtering it and digitizing it, a device 6 for synchronizing the signal to the synchronization sequence associated with the jammer, a device 7 for estimating the channel associated with the jammer signal, carried out on each of the input pathways, a device 8 for estimating the useful signal samples, coupled to the device 7 for estimating the jammer channel so as to deduct the contribution of the jammer signal on the synchronization sequence associated with the jammer, and a radio direction finder 9 for the radio direction finding of the useful signal coupled to the output of the useful signal estimation device 8. The estimation device 8 can be achieved with the aid of a microprocessor for carrying out the processing of step 3.

The second embodiment of the invention corresponds to the case where the signals $\overline{X}(t)$ which represent the multi-sensor signal received are expressed in the following way on the basis of the signal s(t) formed according to formula (1) from the symbols emitted by the useful signal:

$$\overline{X}(t)=[x_1(t),\ldots,x_K(t)]^T=s(t)^*\overline{G}(t)+\overline{B}(t),$$

where $\overline{G}(t)$ is the useful multisensor channel received, consisting of the overall emission waveform $C_0(t)$, of the emission filter, of the jammer propagation channel $\overline{C}(t)$ and of the reception filter, $x_i(t)$ is the signal received on sensor i, $\overline{B}(t)$ is the contribution of the jammer signals and of the background noise.

$\overline{X}(t)$ can also be written as a function of the useful symbols transmitted:

$$\overline{X}(t) = \sum_n s_n \overline{G}(t - nTs) + \overline{B}(t). \tag{13}$$

where Ts is the symbol period.

Figure 4:
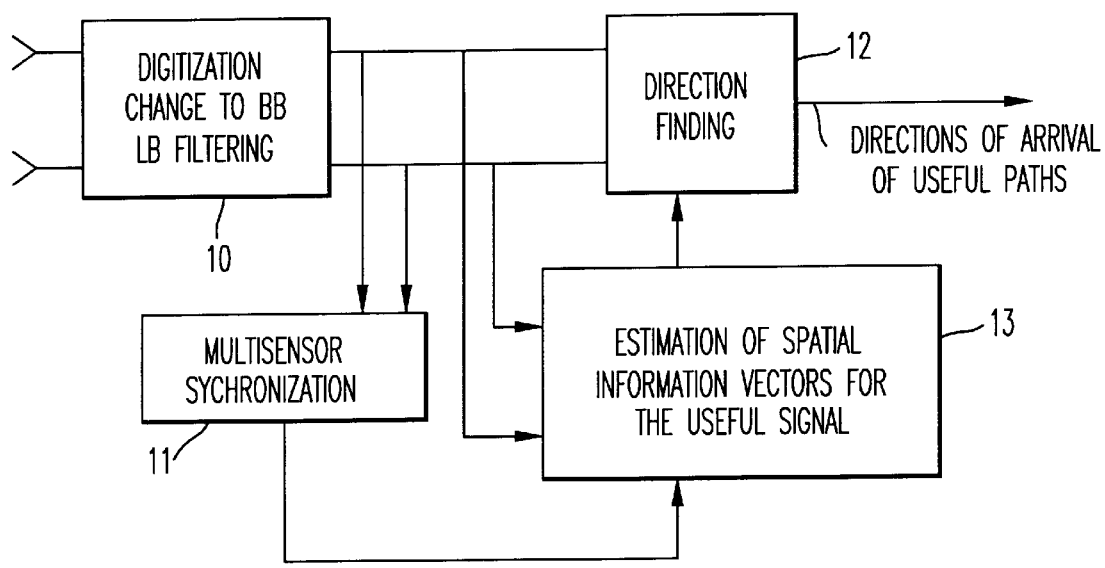

The process then runs according to steps 10 to 13 of the flow chart represented in FIG. 4. It commences at step 10 with the digitizing of the signals received and of their filtering according to a procedure similar to that already described during the first step of the process represented in FIG. 2. The next step 11 is a synchronization step which makes it possible to position the receiver in such a way that the signal received $\overline{X}(n\,Te)$ is expressed as a function of the useful signal emitted s(nTe), s[(n−1)Te], ..., s[(n−L+1)Te], where L represents the length (in terms of number of samples) of the useful propagation channel taken into account during the channel estimation and the direction finding through the relation:

$$\overline{X}(n\,Te) = \sum_{p=0}^{L-1} s[(n-p)Te]\overline{G}(p\,Te) + \overline{B}(n\,Te) \tag{14}$$

The direction finding is performed in step 12 after having in step 13 estimated vectors containing the spatial information associated with the useful paths.

These vectors are used by performing either a correlation between the vector containing the sensor signals and the useful signal emitted on the reference sequence, or an estimation of the useful channel on each of the input pathways.

The vectors containing the spatial information associated with the useful paths can be obtained by performing a correlation between the vector containing the sensor signals and the useful signal emitted on the reference sequence:

$$\overline{V}_k = \frac{1}{N}\sum_{n=0}^{N} \overline{X}(n\,Te)z((n-k)Te)^* \quad (k=0,\ldots,L-1) \tag{15}$$

The estimation of the useful channel on each of the input pathways can also be used to determine the vectors containing the spatial information associated with the useful paths and is effected by considering $\overline{G}_k$ the vector made up of the temporal samples of the useful propagation channel on pathway k:

$$\overline{G}_k = (g_k(0),\ldots,g_k[(L-1)Te])^T \tag{16}$$

where $g_k(t)$ represents the useful channel obtained on pathway k.

Denoting: $\overline{S}(n\,Te)=\{s(n\,Te),\ldots,s[(n-L+1)Te]\}^T$ the vector formed with the aid of the useful symbols known to the learning sequence, the signal received by antenna k can be written:

$$x_k(n\,Te) = \overline{G}_k^H \overline{S}(n\,Te) + b_k(n\,Te) \tag{17}$$

The estimation of the useful channel on pathway k is obtained through the Wiener formula used during the first method for estimating the jammer channel (8) (9).

The L vectors $\overline{V}_i$ (of dimension K) containing the spatial information are formed from the vectors $G_k$ in the following way:

$$[\overline{V}_o \ldots \overline{V}_{L-1}] = [\overline{G}_1^T \ldots \overline{G}_k^T]^T \tag{18}$$

On the basis of the estimation of the vectors containing the spatial information associated with the useful signal, the direction finding of the useful signal can be obtained according to four different possibilities:

In a first case, a direction finding is implemented for each vector $\overline{V}_i$ (i=0, ..., L−1):

In this configuration, the direction finding:

makes it possible to separate all the decorrelated paths, each of the decorrelated paths being associated with a different vector $\overline{V}_i$, must separate the correlated paths associated with one and the same vector $\overline{V}_i$.

In a second case, a direction finding is performed on the basis of the correlation matrix R calculated on the vectors $\overline{V}_i$ obtained on one and the same frame through the relation:

$$R_i = \sum_n \overline{V}_i \overline{V}_i^H \tag{19}$$

In this configuration, the direction finding must separate all the paths associated with the useful source, whether they be correlated or decorrelated.

In a third case, a direction finding is performed for each position i on the basis of the correlation matrix $R_i$ calculated on the vectors $\overline{V}_{i,n}$ determined over N frames (n=1, ... N), $$R_i = \sum_n \overline{V}_{i,n} \overline{V}_{i,n}^H \quad (20)$$

In this configuration, the direction finding, as in the first case:
  makes it possible to separate all the decorrelated paths, each of the decorrelated paths being associated with a different vector $\overline{V}_i$,
  must separate the correlated paths associated with one and the same vector $\overline{V}_i$.

The benefit in averaging over the results obtained over N frames is on the one hand to attenuate the effects of fading and on the other hand to temporally decorrelate (through the Doppler effect related to the motion of the vehicle) the paths associated with the same symbol.

In a fourth case, a direction finding is performed on the basis of the correlation matrix R obtained by averaging the correlation matrices $R_i$.

$$R_i = \sum_i R_i \quad (21)$$

In this configuration, as in the second case, the direction finding must separate all the paths associated with the useful source, whether they be correlated or decorrelated. As in the previous case, the benefit in averaging the results obtained over N frames is on the one hand to attenuate the effect of fading and on the other hand to temporally decorrelate the paths associated with the same symbol.

Figure 5:
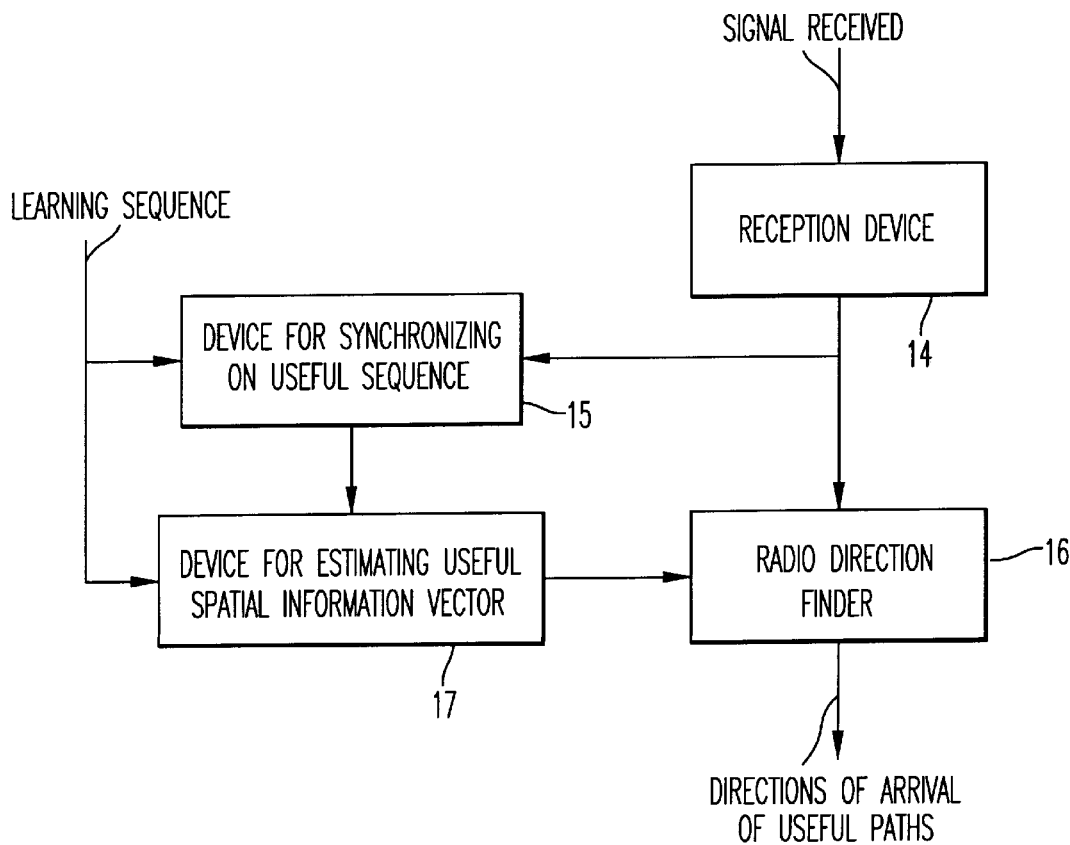

A receiver for implementing the second embodiment of the invention is represented in FIG. 5. It comprises a device 14 for receiving the signal received on each reception pathway, accompanied in a known manner by a device, not represented, for changing the signal to baseband, low-pass filtering it and digitizing it. A device 15 ensures the synchronization of the signal to the synchronization sequence associated with the useful signal according to step 11 of the process. A direction finder 16 coupled at the output of the reception device 14 provides for the direction finding of the useful signal on the basis of the spatial information vectors provided by an estimation device 17 coupled to the synchronization device 15. The implementation of the estimation device 17 can be effected with the aid of a microprocessor programmed so as to carry out the processing of step 13.

What is claimed is:

1. Process of cooperative radio direction finding in transmission mode in a radio direction finding receiver for radio communication system comprising several emission sources, the receiver being of the type comprising a network of sensors coupled to a radio direction finder characterized in that it comprises:
   a first step of digitizing the signal received by each sensor,
   a second step of performing a capture of synchronization on the signals emanating from the first step;
   and a third step of on the basis of the learning sequences inserted into the waveforms emitted by each source, isolating the contribution of each source in the sensor signals so as to perform the direction finding on a single source only.

2. Process according to claim 1, characterized in that the signal received is a signal modulated according to a linear modulation or one which can be approximated as such comprising frames formed of learning sequences known to the receiver and of useful information sequences.

3. Process according to claim 1, characterized in that, for performing the direction finding on a useful signal in the presence of at least one jammer signal source, performing the following processing:
   estimating the jammer channel on all the sensors,
   estimating the useful signal on all the sensors by deducting the contribution of the jammer signal from the sensor signals with the aid of the jammer channel estimates obtained on each sensor,
   direction finding on the samples of estimated useful signal.

4. Process according to claim 1, characterized in that, when there are several jammers, mutually synchronizing the learning sequences for the entire set of these signals so as to estimate the channels associated with all the jammer sources and estimating the useful signal by deducting the contribution of all the sources of jammers.

5. Process according to claim 1, characterized in that, for performing the direction finding of a so-called useful signal in the presence of so-called jammer signals, performing the following processing on the learning sequence of the useful signal:
   calculating vectors containing the spatial information of each of the paths associated with the useful signal on the learning sequence of the useful signal,
   direction finding on the basis of the vectors thus estimated.

6. Process according to claim 5, characterized in that the vectors are obtained by correlation between the signal vectors and the learning sequence over the length of the impulse response of the useful channel.

7. Process according to claim 5, characterized in that the vectors are determined from channel estimation carried out on each of the pathways.

8. Process according to claim 5, characterized in that the direction finding is performed on each of the spatial information vectors estimated on a given frame.

9. Process according to claim 5, characterized in that the direction finding is performed by calculating the correlation matrix over the set of spatial information vectors estimated on a given frame.

10. Process according to claim 5, characterized in that the direction finding is performed by estimating the spatial information vectors over several frames, by calculating a correlation matrix for each path associated with the useful signal, taking into account the corresponding vectors on each frame.

11. Process according to claim 5, characterized in that the direction finding is performed on the basis of the correlation matrix obtained by calculating the average of the correlation matrices of each path.

12. Device for implementing the process according to claim 5, characterized in that it comprises a reception device for digitizing the signals received, a device for synchronizing on synchronization sequences associated with the useful signal, a useful spatial information vector estimation device and a radio direction finder which is coupled at the output of the reception device so as to perform a useful signal direction finding on the basis of the spatial information vectors provided by the estimation device.

13. Device for implementation according to claim 1, characterized in that it comprises a reception device for digitizing the signals received, a device for synchronizing on synchronization sequences associated with the jammers, a jammer channel estimation device coupled to a radio direction finder through a useful signal estimation device.

* * * * *